United States Patent Office 3,256,281
Patented June 14, 1966

3,256,281
ALKOXYLATED MIXTURES OF DI- AND TRI-AMINO-1,3,5-TRIAZINE-POLYOLS AND A PROCESS FOR THEIR PRODUCTION
Donald W. Kaiser, Hamden, and John K. Zane, East Haven, Conn., assignors to Olin Mathieson Chemical Corporation, a corporation of Virginia
No Drawing. Filed Jan. 4, 1963, Ser. No. 249,333
16 Claims. (Cl. 260—249.6)

The present invention relates to a novel process for coalkoxylating amino-1,3,5-triazines having at least two primary or secondary amino groups admixed with certain polyols and for the manufacture of polyurethane compositions by reacting the coalkoxylated mixtures with polyisocyanates.

By the term "coalkoxylation" in the present specification and claims, it is intended to mean alkoxylation using alkylene oxides having three to eight carbon atoms. Suitable polyols, alkylene oxides and amino-triazines are more particularly defined below.

The present invention relates in one aspect to the coalkoxylation of mixture containing said amino-triazine, for example, melamine or substituted melamines and guanamines or substituted guanamines. Heretofore, the aminotriazines have been exceedingly difficult to alkoxylate. It has been frequently impossible to obtain any product whatever. Attempted alkoxylations in the absence of solvent or with conventional solvents for this type of reaction, for example, dimethylformamide, ethylene glycol dimethyl ether, diethylene glycol dimethyl ether, dioxane and xylene yield only starting materials or severe conditions are required to obtain but poor yields of alkoxylation products.

It has been found, surprisingly and unexpectedly, that an amino-1,3,5-triazine having at least two primary or secondary amino groups may be readily and conveniently reacted with an alkylene oxide in the presence of certain polyols as described below to form alkoxylation products of the amino-triazine components and of the polyol components. The coalkylation products are obtained in excellent yields and are especially useful in the manufacture of polyurethane products. The reaction is conducted in the presence of a basic catalyst, at a temperature of between about 75 and 175° C. and the ratio of the amino-triazine-polyol mixture to alkylene oxide is from 1:2 to 1:125.

Polyols suitable for use in the present invention contain at least two hydroxyl groups and may be aliphatic or aromatic, saturated or unsaturated. Our preferred polyol is glycerol due to availability and ease of reaction. Others which may be employed include ethylene glycol, propylene glycol, 1,4-butanediol, diethylene glycol, dipropylene glycol, neopentyl glycol, triethylene glycol, hexamethylene glycol, hexanetriol, 2-butene-1, 4-diol, 2-butyne-1, 4-diol and butanetriol. In addition, many polyols, when propoxylated or otherwise alkoxylated, are especially useful. For example, trimethylolpropane, trimethylolethane, pentaerythritol, polyglycerol, dipentaerythritol, polypentaerythritol, erythritol, mannitol, sorbitol, p,p'-isopropylidendiphenol, resorcinol, catechol, hydroquinone, alkyl gucosides, for example, methyl glucoside and 4,4'-dihydroxybenzophenone, when propoxylated, are excellent. Polyols having three or more hydroxyl groups are preferred for coalkoxylation with substituted melamines having only two reactive hydrogen atoms in order to increase the functionality of the composition. The glycols of lower functionality are suitable where the amino-triazine components has a high functionality. All of these polyols alkoxylate to form excellent reaction media and coalkoxylation products.

Polyol amines can be used in place of or in admixture with the above-mentioned polyols. The additional nitrogen content of these amines and their additional basicity, when later neutralized, contribute advantageously to the fire retardant properties of the resultant urethanes. Polyol amines advantageously include the alkanolamines, especially monoethanolamine, diethanolamine and triethanolamine. These polyol amines are especially preferred since they all have a functionality of three and are readily coalkoxylated with the aminotriazines. They also form polyols which are excellent reaction media. Suitable polyol amines may also be prepared in situ by alkoxylation of amines having a functionality of at least two. Suitable amines for alkoxylation can be aliphatic or aromatic, mono or polyamines with the proviso that they shall have a functionality of at least two and preferably more than two. Functionality in the present specification and claims means the number of hydrogen atoms in the molecule which are reactive with alkylene oxides. For example, polyamines including ethylene diamine and polyalkylene polyamines including diethylene triamine and triethylene tetraamine and aromatic polyamines for example, toluylene diamine are especially useful. Primary monoamines have a functionality of two and are suitable especially in combination with polyols and aminotriazines of higher functionality. In this way, aniline and toluidine are useful. The lower aliphatic primary monoamines are useful especially when used under pressure. Examples include methylamine, ethylamine, butylamines and hexylamines. All of these amines coalkoxylate rapidly under the reaction conditions with the aminotriazines to form suitable polyol products for foam preparation.

The reaction is preferably conducted without the addition of any inert solvent, the use of the polyols described above avoiding the necessity of later removing an inert solvent. However, in some instances the additional incorporation of an inert solvent in the mixture is desirable in spite of the necessity of removing it later. Particularly when melamine or other more difficultly soluble and higher melting amino-triazoles are the starting materials, the addition of dimethyl sulfoxide is advantageous. Especially advantageous results are obtained when the dimethyl sulfoxide constitutes 5 to 100 percent of the solvent used since then the triazines are more readily dissolved and alkoxylated. The total solvent component may consist of the dimethyl sulfoxide, or for economy, varying amounts of less expensive solvents may be employed, for example, diethylene glycol dimethyl ether. When the alkoxylation reaction is completed, the inert solvent is removed by distillation at atmospheric or, preferably under reduced pressure. Alternatively the amino-triazine mixture can be partially oxyalkylated, the inert solvent removed by distillation and the oxyalkylation continued.

In accordance with the present invention it has been surprisingly found that when a mixture containing at least 10 percent by weight of suitable polyol and at least 10 percent of the amino-triazine is employed, both the amino-triazine and the polyol are readily and expeditiously alkoxylated without difficulty by simply admixing the reactants in the desired proportions at the desired temperature and in the presence of a basic catalyst. To facilitate the reaction, it may be carried out under pressure of up to about 50 p.s.i.g. The oxides can be introduced either in gases or liquids.

In accordance with the process of the present invention, amino-1,3,5-triazines containing at least two primary or secondary amino groups are suitable. The aminotriazine starting materials which are suitable have the formula:

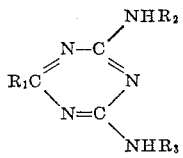

wherein:

$R_1$ is selected from the group consisting of hydrogen, lower alkyl, aryl, heterocyclic and $-NR_4R_5$;

$R_2$ and $R_3$ are each independently selected from the group consisting of hydrogen, lower alkyl and aryl;

$R_4$ is selected from the group consisting of hydrogen, lower alkyl, aryl and lower alkene; and $R_5$ is selected from the group consisting of hydrogen, lower alkyl and lower alkene.

Examples of such compounds include 2,4,6-triamino-1,3,5-triazines, particularly melamine and substituted melamines and the 4,6-diamino-1,3,5-triazines, particularly guanamines including formoguanamine, the 2-substituted-4, 6-diamino-1,3,5-triazines and the substituted guanamines. Suitable lower alkyl radicals contain from 1 to 6 carbon atoms, inclusive, for example, methyl, ethyl, propyl, butyl, amyl, hexyl and isomers thereof. The lower alkene radical is any alkene radical containing from 1 to 6 carbon atoms, inclusive for example, allyl, butenyl and pentenyl and isomers thereof. Examples of aryl radicals include naphthyl, anthracyl, and preferably phenyl or chlorophenyl. In addition, all of the foregoing radicals may be substituted with non-interfering substituents or with substituents which do not enter into the alkoxylation reaction.

It is advantageous in many instances to synthesize the amino-triazine component in admixture with the solvent polyol, solvent amine or their partial alkoxylation products and then to alkoxylate the mixture further. For example, acetoguanamine is synthesized in propoxylated glycerol by addition of cyanoguanidine and acetonitrile, refluxing at 126° C. until the latter is completely reacted to form acetoguanamine and the mixture is then cooxypropylated by the introduction of further amounts of propylene oxide.

In the present specification and claims, the term alkylene oxide is intended to include alkylene oxides having 3 to 8 carbon atoms and such alkylene oxides containing non-interfering substituents. In addition, the term is intended to include carbocyclic oxides having 8 carbon atoms or less, for example, styrene oxide. Glycidol is an example of a suitable substituted alkylene oxide. The unsubstituted alkylene oxides, especially the lower alkylene oxides are preferred, for example, propylene oxide, butylene oxide, isobutylene oxide and n-hexylene oxide. The cycloalkylene oxides may be, for example, cyclobutylene oxide and cyclohexylene oxide.

The reaction is accelerated by employing elevated temperatures from 75 to 175° C. and preferably from 90° to 140° C. and by the use of basic catalysts, both organic and inorganic. The catalyst is preferably an alkali metal hydroxide or alkoxide, for example, sodium hydroxide, potassium hydroxide and sodium methoxide. The reaction is initially exothermic and cooling is normally employed to maintain the reaction at the desired temperature. The reaction time is not critical and will vary depending upon the degree of completion desired, temperature and reactants.

The ratio of the aminotriazine-polyol mixture to alkylene oxide may vary from 1:2 to 1:125. Thus alkoxylation products may be tailor-made for particular properties depending upon the proportion of alkylene oxide employed. The properties of the resultant mixture depends on the character of the substituents and the proportion of alkylene oxide employed.

The coalkoxylation product is treated with acid to neutralize the basic catalyst and the basic oxyalkylation products themselves. Advantageously the apparent pH is adjusted to 5 to 9 and preferably about 7. (The "apparent pH," as this term is used in the present specification, including the examples, is determined by measuring the pH of a solution of 10 grams of the sample in 50 ml. of a mixture of 10 parts by volume of isopropanol and 6 parts of water.) The acid used for neutralization of the catalyst is not critical. For example, monoammonium phosphate, sulfamic, phosphoric, hydrochloric, trichloracetic or sulfuric acids are useful.

Finally it is advantageous to treat the oxyalkylation reaction product by adding a clarifying or decolorizing agent, for example, adsorptive clay, either before or after neutralization and ultimately removing it, for example, by filtration.

The coalkoxylation products of the present invention have highly desirable characteristics as the polyol component in flexible, rigid and semi-rigid polyurethane film or foam compositions by reaction with a diisocyanate. In the presence of a foaming agent and catalyst, polyurethane foams are formed which are characterized by greatly improved flame retardance, humid-aging properties and hydrolytic stability.

Suitable organic polyisocyanates which may be employed in the preparation of the polyurethane foams include di-isocyanates, tri-isocyanates, and polyisocyanates. Especially preferred are mixed isomers of toluylene diisocyanate which are readily available commercially. Other suitable isocyanates include methylene-bis-(4-phenyl isocyanate), 3,3'-bitolylene-4,4'-di-isocyanate, 3,3'-dimethoxy-4,4'-bi-phenylene di-isocyanate, napthalene-1,4-diisocyanate, hexamethylene di-isocyanate, PAPI(polymethylene polyphenyl isocyanate) and 1,4-phenylene di-isocyanate. The amount of isocyanate employed in the preparation of the polyurethane foams should be sufficient to provide at least 0.7 NCO groups based on the number of hydroxyl groups present in the coalkyoxylation products of the present invention, the number of hydroxyl groups in any additive employed and the number of hydroxyl groups employed in the foaming agent. An excess of isocyanate compound may be conveniently employed; however, this is generally undesirable due to the high cost of the isocyanate compounds. It is preferable, therefore, to employ no greater than 1.5 NCO groups based on the number of hydroxyl groups and preferably between about 0.9 and 1.1 NCO groups.

Pre-polymers can be formed from the polyols of the present invention by reaction with a suitable excess of a di-isocyanate. The proportion of di-isocyanate in these prepolymers is suitable to provide from 1.4 to 3.0 NCO groups per hydroxyl group. The prepolymers are subsequently reacted with additional polyol with or without additional di-isocyanate in applications where the use of pre-polymers is advantageous.

The polyurethane foams are prepared in the presence of a foaming agent and a reaction catalyst. The foaming agent employed may be any of those known to be useful for this purpose, such as water, the halogenated hydrocarbons and mixtures thereof. Typical halogenated hydrocarbons include, but are not limited to, the following: monofluorotrichloromethane, difluorodichloromethane, 1,1,2-trichloro-1,2,2-trifluoroethane, methylene chloride, chloroform and carbon tetrachloride. The amount of foaming agent employed may be varied within a wide range. Generally however, the halogenated hydrocarbons are employed in an amount of foam 1 to 50 parts by weight per 100 parts by weight of the adduct of the present invention, and generally the water, when employed, is in an amount of from 0.1 to 10 parts by weight per 100 parts by weight of the adduct of the present invention.

The polyurethane forms are prepared in the presence of a catalyst amount of a reaction catalyst. The catalyst employed may be any of the catalysts known to be useful for this purpose, including tertiary amines and metallic salts. Suitable tertiary amines include N-methyl morpholine, N-hydroxyethyl morpholine, triethylene diamine, triethylamine, trimethylamine and N,N-dimethylethanolamine. Typical metallic salts include, for example, the salts of antimony, tin and iron, for example, dibutyltin dilaurate and stannous octoate. The catalyst is usually employed in an amount of from 0.1 to 2.0 percent by weight based on the coalkoxylation product of the present invention.

In the preparation of the polyurethane foams of the present invention minor amounts of emulsifier are preferably used to improve the cell structure of the polyurethane foam. Typical of such emulsifiers are the silicone oils and soaps. Generally up to 2 parts by weight of the surfactant is employed per 100 parts of polyol.

Various additive can be employed which serve to provide different properties, e.g. fillers, such as clay, calcium carbonate or calcium sulfate. These additive lower the cost and improve physical properties. Dyes may be added for color, and fibrous glass, asbestos, or synthetic fibers may be added for strength. In addition, plasticizers, deodorants and anti-oxidants may be added.

The polyurethane foams of the present invention are not readily combustible, due to their high nitrogen content and to their content of neutralized acid. They retain these qualities after long exposure to elevated temperature and high humidity, thus widely expanding their range of utility. In addition, the alkoxylation products of the present invention are prepared from inexpensive raw materials and can be tailor-made to suit desired viscosity and hydroxyl number requirements. They are surprisingly low in viscosity and many are high in hydroxyl number both of which are highly desirable for polyurethane foam manufacture. Unexpectedly, the foams have a delayed rise time and short tack free time which makes them especially valuable for closed molding.

EXAMPLE I

*Copropoxylation of Melamine and Pentaerythritol*

A 3-necked round bottom flask was charged with a mixture of 126 g. (1.0 mole) of melamine, 136 g. (1.0 mole) of pentaerythritol, 8 g. of 85 percent potassium hydroxide, and 750 ml. of dimethyl sulfoxide. The flask was then tared. The stirred mixture was heated under nitrogen to 100° C. and propylene oxide was gradually added to the thin slurry.

The reaction was initially exothermic and the temperature rose to 135° C. After a total of 1146 g. of proylene oxide was reacted and the solution allowed to cool, the catalyst was neutralized with 7 g. of 85 percent phosphoric acid. An additional 14 g. of 85 percent phosphoric acid was then added to lower the pH to 7–8, followed by 50 g. of Attapulgus adsorptive clay. The dimethyl sulfoxide was stripped off, first at 125° C. in a water aspirator vacuum and then at 150° C. at 1 to 2 mm. The hot mixture was filtered by suction through filter paper coated with Celite filter aid. Analysis gave the following values:

| | |
|---|---|
| Hydroxyl number | 327 |
| Acid number | 1.07 |
| Water, percent | 0.04 |
| Apparent pH | 8.5 |
| Viscosity at 100° F., centistokes | 1,733 |

EXAMPLE II

*Copropoxylation of melamine and glycerol*

A 3-necked round bottom flask was charged with 378 g. (3.0 moles) of melamine, 18 g. of 85 percent potassium hydroxide, and 600 ml. of dimethyl sulfoxide. Propoxylation was carried out at 100° C. and after 800 g. of propylene oxide had reacted a light yellow solution formed. At this stage, 276 g. (3.0 moles) of glycerol was added and propoxylation continued until a total of 2429 g. of propylene oxide had been reacted. The catalyst was neutralized with 15.8 g. of 85 percent phosphoric acid. A 400 g. portion was removed for work up as the free base. This portion was designated as A.

After the addition of 25 g. of Attapulgus decolorizing clay to the A portion, the mixture was stripped, first with a water pump at 120° C. and then at 150° C. at 1 to 2 mm. The hot material was then filtered by suction through filter paper coated with Celite filter aid.

The remaining solution of the original reaction mixture, designated as B, was treated with an additional 47 g. of 85 percent phosphoric acid to lower the pH. Attapulgus decolorizing clay (150 g.) was added and the mixture stripped and worked up as with A.

Analysis of both portions are shown below:

| | A | B |
|---|---|---|
| Hydroxyl Number | 432 | 418 |
| Alkaline Number | 3.35 | 0.42 |
| Water, percent | 0.16 | 0.06 |
| Apparent pH | 12.1 | 8.1 |
| Viscosity at 100° F., centistokes | 3,119 | 4,380 |

EXAMPLE III

*Copropoxylation of acetoguanamine and pentaerythritol*

A. *Copropoxylation.*—A stirred mixture of 375 g. (3.0 moles) of acetoguanamine, 408 g. (3.0 moles) of pentaerythritol, 18 g. of 85 percent potassium hydroxide, and 1000 ml. of dimethyl sulfoxide was heated to 100° C. under nitrogen. Propylene oxide was then gradually added and, after 800 g. had reacted, complete solution occurred. Reaction was exothermic during the entire period of propoxylation (7 hours 40 minutes). A total of 2593 g. of propylene oxide was reacted. The catalyst was neutralized with 15.7 g. of 85 percent phosphoric acid. An additional 38 g. of acid was required to lower the apparent pH to 8.7. Following addition of 200 g. of Attapulgus clay, the mixture was stripped with a final temperature of 150° C. and 1–2 mm. The hot mixture was filtered by suction through Celite covered paper. The syrup gave the following analysis:

| | |
|---|---|
| Hydroxyl number | 369 |
| Alkaline number | 1.20 |
| Percent water | 0.04 |
| Apparent pH | 8.7 |
| Viscosity 100° F., centistokes | 2,225 |
| Na, parts per million | 2 |
| K, parts per million | 7 |

B. *Foam preparation.*—The copropoxylated polyol thus prepared was used in the preparation of a polyurethane foam by mixing the following components:

| Components: | Parts by weight |
|---|---|
| Polyol of Example III | 100 |
| Emulsifier (silicone) | 1.3 |
| Catalyst (stannous octoate) | 0.2 |
| Foaming agent (Freon–11)[1] | 25 |
| Toluyl di-isocyanate | 62 |

[1] Freon–11 is trichloromonofluoromethane.

The resulting foam was self-extinguishing by ASTM Method D 1692–59T. It had a density of 2.1 pounds per cubic foot and a compressive strength of 21.0 pounds per square inch.

EXAMPLE IV

*Copropoxylation of benzoguanamine and pentaerythritol*

A. *Preparation of benzoguanamine.*—A stirred mixture of 269 g. (3.2 moles) of cyanoguanidine, 309 g. (3.0 moles) of benzonitrile, 15 g. of 85 percent potassium hydroxide and 750 ml. of dimethyl sulfoxide was warmed to 80° C. under nitrogen. The temperature then rose rapidly to 145° C. The temperature fell to 100° C. and was maintained at this point for 2 hours.

B. *Copropoxylation.*—At the end of 2 hours 408 g. (3.0 moles) of pentaerythritol was added to the solution of the benzoguanamine prepared in A. The temperature fell slightly and after reheating to 100° C., a clear, straw colored solution reformed. Propoxylation was exothermic. A total of 2279 g. of propylene oxide was reacted. Addition of 56 g. of 85 percent phosphoric acid was required to neutralize the catalyst and lower the pH to 7 to 8. Attapulgus adsorptive clay (125 g.) was added and the mixture was stripped at 125° C. in a water aspirator vacuum for 3 hours. The hot mixture was filtered through paper covered with Celite filter aid and the clear filtrate was stripped further at 150° C. at 1 to 2 mm. Analysis gave the following results:

| | |
|---|---|
| Hydroxyl number | 383 |
| Acid number | 1.8 |
| Water, percent | 9.11 |
| Apparent pH | 7.5 |
| Viscosity at 100 F., centistokes | 11,629 |

C. *Foam preparation.*—The copropoxylated polyol of this example was used in the preparation of a polyurethane foam by mixing the following components:

| Components: | Parts by weight |
|---|---|
| Polyol of Example IV | 100 |
| Emulsifier (silicone) | 1.3 |
| Catalyst (stannous octoate) | 0.2 |
| Foaming agent (Freon–11) | 25 |
| Toluyl di-isocyanate | 63 |

The resulting foam was self-extinguishing by ASTM Method D 1692–59T. It had a density of 1.9 pounds per cubic foot, a tensile strength of 33 pounds per square inch and a compressive strength of 22 pounds per square inch.

EXAMPLE V

*Copropoxylation of actoguanamine and triethanolamine*

A. *Preparation of acetoguanamine.*—A stirred mixture of 92 g. (1.10 mole) of cyanoguanidine, 3 g. of 85 percent potassium hydroxide, and 149 g. (1.0 mole) of triethanolamine was heated to 70° C. Acetonitrile (41 g.; 1.0 mole) was added slowly during a half-hour. The temperature was gradually increased to 100° C. and maintained there until refluxing ceased.

B. *Copropoxylation.*—Propylene oxide was passed into the reaction mixture from A at 100° C. until 540 g. was taken up. The catalyst was neutralized with 2.6 g. of 85 percent phosphoric acid. To lower the pH, an additional 75 g. of 85 percent phosphoric acid was added. After the addition of 30 g. of adsorbent Attaclay, the mixture was initially stripped under water aspirator vacuum at 100° C. The clay was filtered out and the filtrate given a final stripping at 150° C. under a pressure below 1 mm. Analysis gave the following values:

| | |
|---|---|
| Hydroxyl number | 416 |
| Water, percent | 0.04 |
| Apparent pH | 7.7 |

EXAMPLE VI

*Copropoxylation of benzoguanamine, triethanolamine Pentaerythritol*

A. *Preparation of benzoguanamine.*—A stirred mixture of 100.8 g. (1.2 moles) of cyanoguanidine, 6.6 g. (0.10 mole) of 85 percent potassium hydroxide, 149 g. (1.0 mole) of triethanolamine, and 103 g. (1.0 mole) of benzonitrile was heated to 70° C. The temperature spontaneously rose to 145° C. The temperature of the now thick slurry was raised to 150° C. and kept there for 2½ hours to complete guanamine formation.

B. *Copropoxylation.*—The guanamine slurry prepared in A was propoxylated at 150° C. After 380 g. of propylene oxide had reacted, 136 g. (1.0 mole) of pentaerythritol was added to the yellow liquid and propoxylation was completed. A total of 958 g. of propylene oxide was used.

A solution of 115 g. (1.0 mole) ammonium dihydrogen phosphate in 350 ml. of water was added to the resulting polyol mixture. After mixing, 15 g. of 28 percent aqueous ammonia was added to lower the acid number. Finally, 50 g. of adsorbent Attaclay was added and the stirred mixture concentrated under reduced pressure to remove water. A final temperature of 150° C. at 1 to 2 mm. was employed. Analysis of the filtered polyol gave the following results:

| | |
|---|---|
| Hydroxyl number | 385 |
| Acid number | 13.7 |
| Apparent pH | 7.9 |
| Water, percent | 0.02 |

C. *Foam preparation.*—A good polyurethane foam was prepared from the copropoxylated polyol obtained in B above by preparing a mixture containing the following components:

| Components: | Parts by weight |
|---|---|
| Polyol of Example VI | 100 |
| Emulsifier (silicone) | 1.3 |
| Catalyst (stannous octoate) | 0.2 |
| Foaming agent (Freon–11) | 25 |
| Toluyl di-isocyanate | 65 |

In ASTM Method D 1692–59T, this burned at an average rate of 4 inches per minute, showing significant fire retardant properties.

EXAMPLE VII

*Copropoxylation of acetoguanamine, tolylenediamine and pentaerythritol*

A. *Propoxylation of toluylenediamine.*—A stirred mixture of 122 g. (1.0 mole) of toluylenediamine and 1 g. of dry sodium methylate was heated to 150–160° C. and propoxylated with 309 g. of propylene oxide, giving a reddish syrup.

B. *Synthesis of acetoguanamine.*—After cooling, 100.8 g. (1.2 moles) of cyanoguanidine and 6.6 g. (0.10 mole) of 85 percent potassium hydroxide was added to the mixture prepared in A and the mixture stirred at 95° C. for a half hour to dissolve the alkali. Acetonitrile (45.1 g.; 1.10 moles) was added in a 5 minute period, giving a thinner slurry. The temperature was raised to maintain reflux. After a total of 1¾ hours, no reflux occurred at 150° C.

C. *Copropoxylation.*—Propoxylation of the very thick slurry prepared in B was carried out at 150° C. A turbid brown solution resulted after 474 g. of oxide had reacted. After adding 136 g. (1.0 mole) of pentaerythritol, propoxylation was completed. The total weight of reacted propylene oxide was 1322 g. Addition of 57.5 g. (0.50 mole) of 85 percent phosphoric acid gave a pH of 6.5 to 7.0. The pH was raised by addition of 20 g. of 28 percent aqueous ammonia. Adsorptive Attaclay (75 g.) was added and the mixture was concentrated under reduced pressure to remove water. After a final stripping at 150° C. at 1 to 2 mm., the mixture was filtered. Analysis of the product gave the following results:

| | |
|---|---|
| Hydroxyl number | 394 |
| Acid number | 0.7 |
| Apparent pH | 9.15 |
| Percent water | 0.08 |

D. *Foam preparation.*—The copropoxylated polyol of C above was used in the preparation of a polyurethane foam by mixing the following components:

| Components: | Parts by weight |
|---|---|
| Polyol of Ex. VII | 100 |
| Emulsifier (silicone) | 1.0 |
| Catalyst (stannous octoate) | 0.2 |
| Foaming agent (Freon-11) | 25 |
| Toluyl di-isocyanate | 65 |

The cream time was 8 seconds, the rise time was 1 minute 20 seconds and the tack-free time was 3 minutes 45 seconds. Because of the slow rise and short tack-free time, this composition is excellent for molding.

EXAMPLE VIII

*Copropoxylation of acetoguanamine, glycerol and pentaerythritol*

A. *Synthesis of acetoguanamine in propoxylated glycerol.*—A stirred mixture of 92 g. (1.0 mole) of glycerol and 6.6 g. (0.10 mole) of 85 percent potassium hydroxide was heated to 125° C. and 190 g. of propylene oxide was introduced. After cooling to 75° C., 92.5 g. (1.10 moles) of cyanoguanidine was added and the mixture was stirred until a smooth slurry resulted. Then 45.1 g. (1.10 moles) of acetonitrile was added and the temperature was raised to 125° C. The dense, colorless slurry of acetoguanamine was held at this temperature for an hour after all nitrile reflux ceased.

B. *Copropoxylation.*—Propoxylation was continued at 125° C. and reaction with 300 g. of additional propylene oxide gave a clear solution. After standing overnight, 136 g. (1.0 mole) of pentaerythritol was added and copropoxylation completed by reacting a final 710 g. of propylene oxide with the polyol mixture. Neutralization required 23 g. of 85 percent phosphoric acid.

The neutralized polyol was stirred with 50 g. of adsorptive Attaclay and water was stripped under vacuum, finally at 125° C. at below 1 mm. for 3 hours. The mixture was then filtered.

Analysis of the polyol gave the following results:

| | |
|---|---|
| Hydroxyl number | 360 |
| Acid number | 0.37 |
| Water, percent | 0.025 |
| Apparent, pH | 8.35 |

C. *Foam preparation.*—The co-propoxylated polyol of B above was used in the preparation of a polyurethane foam by mixing the following components:

| Components: | Parts by weight |
|---|---|
| Polyol of Ex. VIII | 100 |
| Emulsifier (silicone) | 1.0 |
| Catalyst (stannous octoate) | 1.0 |
| Foaming agent (Freon–11) | 25 |
| Toluyl di-isocyanate | 59 |

For this composition, the cream time was 15 seconds, the rise time was 2.00 minutes and the tack-free time was 7 minutes. These properties make this composition excellent for molding.

EXAMPLE IX

*Copropoxylation of triethanolamine, benzoguanamine, and pentaerythritol*

A. *Propoxylation of triethanolamine.*—A stirred mixture of 13.2 g. (0.20 mole) of potassium hydroxide (85 percent) and 149 g. (1.0 mole) of triethanolamine were heated at 100° C. and about 20 mm. Hg pressure until all of the potassium hydroxide dissolved and the water was removed. Propoxylation was begun and 600 g. of propylene oxide was added.

B. *Synthesis of benzoguanamine.*—The entire 278 g. (3.3 moles) of cyanoguanidine were added to the mixture prepared in A above and the whole was stirred until a smooth white slurry formed. At this time, 309 g. (3.0 moles) of benzonitrile were added and the exothermic reaction raised the temperature slowly to 185° C.

C. *Copropoxylation.*—After stirring the thick white slurry at 150° C. for about 3 hours propoxylation was resumed and an additional 710 g. of propylene oxide were added. Then 272 g. (2.0 moles) of pentaerythritol was added and propoxylation was continued until the total weight of propylene oxide introduced was 1903 g. (33 moles).

Neutralization required 125 g. of 85 percent phosphoric acid which includes 15.4 g. for the catalyst. The neutralized mixture was contacted with 50 g. of acid clay ("Tonsil") and 50 g. of filter aid at 150° C. at a pressure below 1 mm. for 18 hours and then filtered. Analysis gave the following values:

| | |
|---|---|
| Hydroxyl number | 352 |
| Acid number | 25.2 |
| Apparent pH | 7.3 |

D. *Foam preparation.*—An excellent foam was produced from the above copropoxylated polyol by mixing the following components:

| Components: | Parts by weight |
|---|---|
| Polyol of Ex. IX | 100 |
| Emulsifier (silicone) | 1.5 |
| Catalyst (dibutyltin dilaurate) | 0.75 |
| Catalyst (dimethyl ethanolamine) | 0.62 |
| Foaming agent (Freon–11) | 32 |
| Toluyl di-isocyanate | 75.6 |

EXAMPLE X

*Copropoxylation of triethanolamine, acetoguanamine, and pentaerythritol*

A. *Propoxylation of triethanolamine.*—A stirred mixture of 13.2 g. (0.20 mole) of 85 percent KOH and 224 g. (1.5 moles) of triethanolamine were heated at 100° C. under water aspirator vacuum until all of the KOH dissolved and water was removed. Propoxylation was then begun and about 250 g. of the oxide was added.

B. *Synthesis of acetoguanamine and copropoxylation.*—To the propoxylated triethanolamine prepared in A was added 125 g. (1.5 moles) of cyanoguanidine and the mixture was stirred at 100° C. When a smooth white slurry had formed, 66 g. (1.6 moles) of acetonitrile were added and the mixture was slowly heated to 130° C. An exotherm occurred and the temperature rose slowly to 165° C. When the exotherm was spent, the thin, tan slurry was heated at 140° C. for four hours while solids precipitated and the slurry grew thicker. Propoxylation was resumed and 605 g. of propylene oxide was introduced.

A second quantity of 125 g. (1.5 moles) of cyanoguanidine was added followed by 66 g. (1.6 moles) of acetonitrile. The mixture was heated to 140° C. for 3 hours until the reflux of acetonitrile ceased. This indicated that the reaction was nearly completed. Heating was continued for one additional hour and then 204 g. (1.5 moles) of pentaerythritol was added. Propoxylation was then completed by the introduction of propylene oxide to a total amount of 2157 g. (37 moles).

The orange solution was neutralized with 115 g. of 85 percent phosphoric acid. Of this amount, 15.4 g. of the 85 percent acid were required to neutralize the catalyst. The sample was treated with 60 g. of adsorptive clay, stripped at 150° C. under 0.5 mm. pressure and filtered. The product gave the following analysis:

| | |
|---|---|
| Hydroxyl number | 344 |
| Acid number | 33 |
| Apparent pH | 7.6 |

C. *Foam preparation.*—An excellent polyurethane foam was prepared from this copropoxylated polyol product by mixing 100 parts by weight of the polyol, 1.5 parts of silicone emulsifier, 43 parts of foaming agent (Freon–11) and 76.5 parts of toluyl di-isocyanate. No catalyst was necessary. The resulting foam had a density of about 1.5 pounds per cubic foot, compressive strength of about 14.1 pounds per square inch and burned in ASTM D1692–59T at 5.0 inches per minute, indicating significant flame retardant properties.

EXAMPLE XI

*Copropoxylation of triethanolamine, acetoguanamine, and sorbitol*

A. *Preparation of acetoguanamine in triethanolamine.*—A stirred mixture of 92 g. (1.10 moles) of cyanoguanidine, 3 g. 85 percent potassium hydroxide, and 149 g. (1.0 mole) of triethanolamine was heated to 70° C. Acetonitrile (41 g.; 1.0 mole) was added slowly during a half-hour. The temperature was gradually increased to 100° C. and maintained there until refluxing ceased.

B. *Copropoxylation.*—The triethanolamine-acetoguanamine mixture prepared in A was propoxylated at 100° C. by introducing 400 g. of propylene oxide. A clear orange solution resulted. Then 182 g. (1.0 mole) sorbitol were added and propoxylation was continued until a total of 1232 g. (21.3 moles) of propylene oxide had been added.

The product was acidified with 20 percent hydrobromic acid and then the pH was adjusted by the addition of 30 g. of 58 percent ammonium hydroxide.

The product was treated with 50 g. of adsorbent (Attaclay) at 100° C. at about 20 mm. pressure. Most of the volatiles were removed at 100 to 125° C. under water aspirator reduced pressure. The final stripping was accomplished at 150° C. at a pressure below 1 mm. for 16 hours. Analysis of the filtered product gave the following values:

| | |
|---|---|
| Hydroxy number | 393.3 |
| Acid number | 35.3 |
| Percent $H_2O$ | 0.08 |
| Apparent pH | 6.75 |

C. *Foam preparation.*—The following formulation was used in preparing a foam:

| Components: | weight Parts by |
|---|---|
| Polyol of Ex. XI | 100 |
| Emulsifier (silicone) | 1.3 |
| Catalyst (stannous octoate) | 0.3 |
| Foaming agent (Freon–11) | 25 |
| Toluyl di-isocyanate | 65 |

The cream time was 40 seconds and the rise time was a very satisfactory 1 minute 10 seconds.

EXAMPLE XII

*Copropoxylation of propioguanamine and triethanolamine*

A. *Synthesis of propioguanamine in triethanolamine.*—A mixture of 90 g. (1.07 moles) of cyanoguanidine and 4.6 g. (.07 mole) of 85 percent potassium hydroxide were stirred in 149 g. (1.0 mole) of triethanolamine at 75° C. When a smooth white slurry had formed, 57.5 g. (1.04 moles) of propionitrile were added and the temperature was increased to 125° C. After three hours the slurry was considerably thicker and was left to stand overnight under nitrogen.

An additional 4 g. of propionitrile was added and the mixture was heated to 150° until all reflux had ceased.

B. *Copropoxylation.*—Copropoxylation was accomplished by the addition of 648 g. (11.2 moles) of propylene oxide at 150° C. The light amber oil was neutralized with 70 g. of 85 percent phosphoric acid of which 4.0 g. were required for neutralizing the catalyst. The product was then treated with 50 g. of Attaclay and stripped of material volatile at 100° under reduced pressure for 6 hours. The mixture was finally stripped at 125° at below 0.1 mm. Hg pressure for 20 hours and then was filtered. Analysis gave the following values:

| | |
|---|---|
| Hydroxyl number | 356 |
| Alkaline number | 1.5 |
| Water, percent | 0.08 |
| Apparent pH | 9.3 |

C. *Foam preparation.*—A fine cell foam was prepared with this polyether using the following formulation:

| Components: | weight Parts by |
|---|---|
| Product of Example XII | 100 |
| Emulsifier (silicone) | 1.5 |
| Catalyst (dibutyltin dilaurate) | 0.75 |
| Catalyst (dimethylethanolamine) | 0.62 |
| Foaming agent (Freon–11) | 25 |
| Flame retardant (tris(2,3 dibromopropyl) phosphate) | 10 |
| Toluylene di-isocyanate | 72 |

What is claimed is:

1. A coalkoxylation composition prepared by admixing at a temperature between 75 and 175° C. (1) a basic catalyst, (2) an alkylene oxide having 3 to 8 carbon atoms (3) an amino-1,3,5-triazine containing at least two amino groups and (4) a polyol, capable of dissolving said triazine, each of (3) and (4) having a functionality of at least two, the weight ratio of (3) to (4) being between 10:90 and 90:10 and of (3) plus (4) to (2) being between 1:2 and 1:125.

2. The composition of claim 1 in which the polyol is is propoxylated glycerol.

3. The composition of claim 1 in which the polyol is triethanolamine.

4. The composition of claim 1 in which the polyol is a mixture of propoxylated triethanolamine and propoxylated pentaerythritol.

5. The composition of claim 1 in which the amino-1,3,5-triazine is melamine.

6. The composition of claim 1 in which the amino-1,3,5-triazine is acetoguanamine.

7. The composition of claim 1 in which the amino-1,3,5-triazine is benzoguanamine.

8. The composition of claim 1 in which the amino-1,3,5-triazine is propioguanamine.

9. The composition of claim 1 in which the alkylene oxide is propylene oxide.

10. The acid neutralized coalkoxylation composition of claim 1 obtained by admixing sufficient acid with the composition of claim 1 to adjust the apparent pH of the resulting mixture to 5 to 9.

11. The composition of claim 10 in which the acid is phosphoric acid.

12. The process of preparing a coalkoxylation composition which comprises forming a liquid reaction mixture by admixing (1) a basic catalyst, (2) an amino-1,3,5-triazine having at least two amino groups and (3) a polyol, capable of dissolving said triazine, each of (2) and (3) having a functionality of at least two, heating said liquid reaction mixture to a temperature between 75 and 175° C. while passing into said liquid reaction mixture an alkylene oxide having 3 to 8 carbon atoms.

13. The process of claim 12 in which the weight ratio of the amino-1,3,5-triazine to polyol is between 10:90 and 90:10.

14. The process of claim 12 in which the weight ratio of amino-1,3,5-triazine and polyol combined to alkylene oxide is between 1:2 and 1:125.

15. The process in which acid is added to the coalkoxylation composition prepared according to claim 12 to neutralize the basic catalyst and to reduce the alkalinity of the coalkoxylation composition.

16. The process of claim 15 in which acid is added to the coalkoxylation composition to an apparent pH of 5 to 9.

References Cited by the Examiner
UNITED STATES PATENTS

| | | | |
|---|---|---|---|
| 2,381,121 | 8/1945 | Ericks | 260—249.6 |
| 2,824,103 | 2/1958 | Hueni et al. | 260—249.6 |
| 2,980,676 | 4/1961 | Zuppinger et al. | 260—249.6 |
| 3,047,517 | 7/1962 | Wherley | 260—2.5 |
| 3,067,148 | 12/1962 | Sandridge et al. | 260—2.5 |
| 3,108,029 | 10/1963 | Wohnsiedler | 260—249.6 |
| 3,145,207 | 8/1964 | Wohnsiedler | 260—249.6 |

WALTER A. MODANCE, *Primary Examiner.*

DONALD CZAJA, JOHN D. RANDOLPH, *Examiners.*

J. J. KLOCKO, J. M. FORD, *Assistant Examiners.*